July 18, 1961
L. B. McDANIEL
2,992,628
POULTRY NEST
Filed Sept. 2, 1959
4 Sheets-Sheet 4
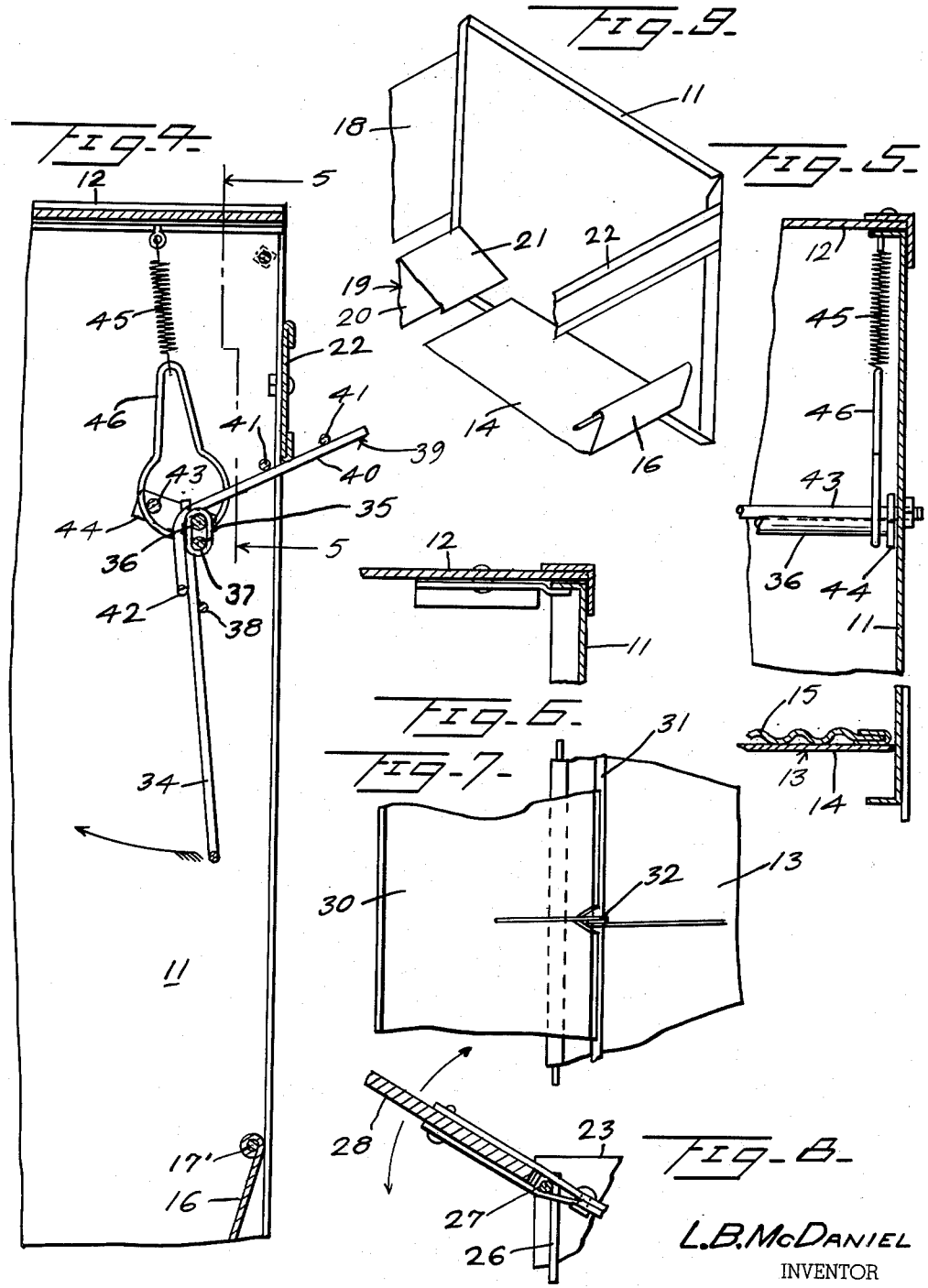
L.B. McDANIEL
INVENTOR
BY C.A. Snow & Co.
ATTORNEYS.

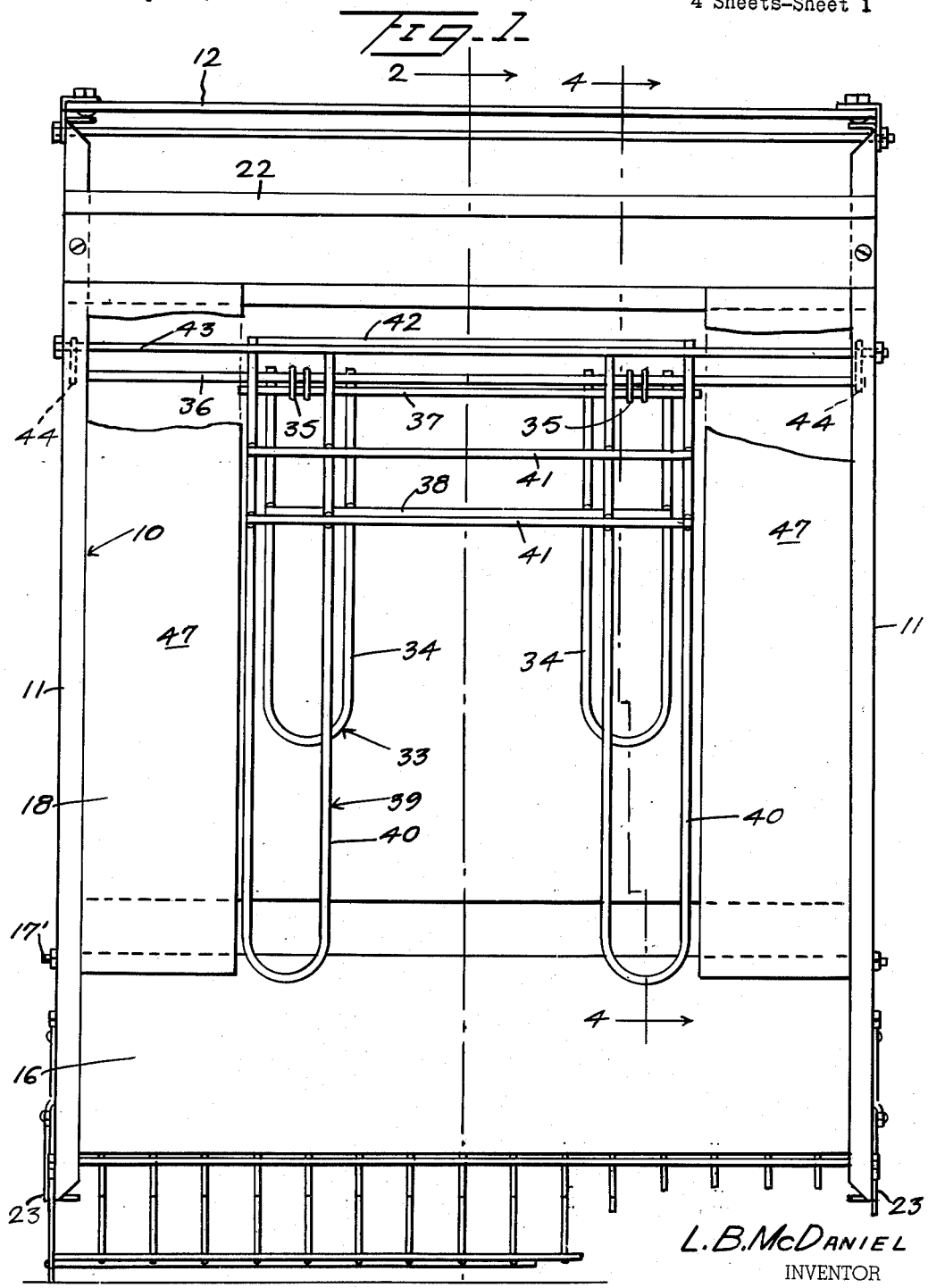

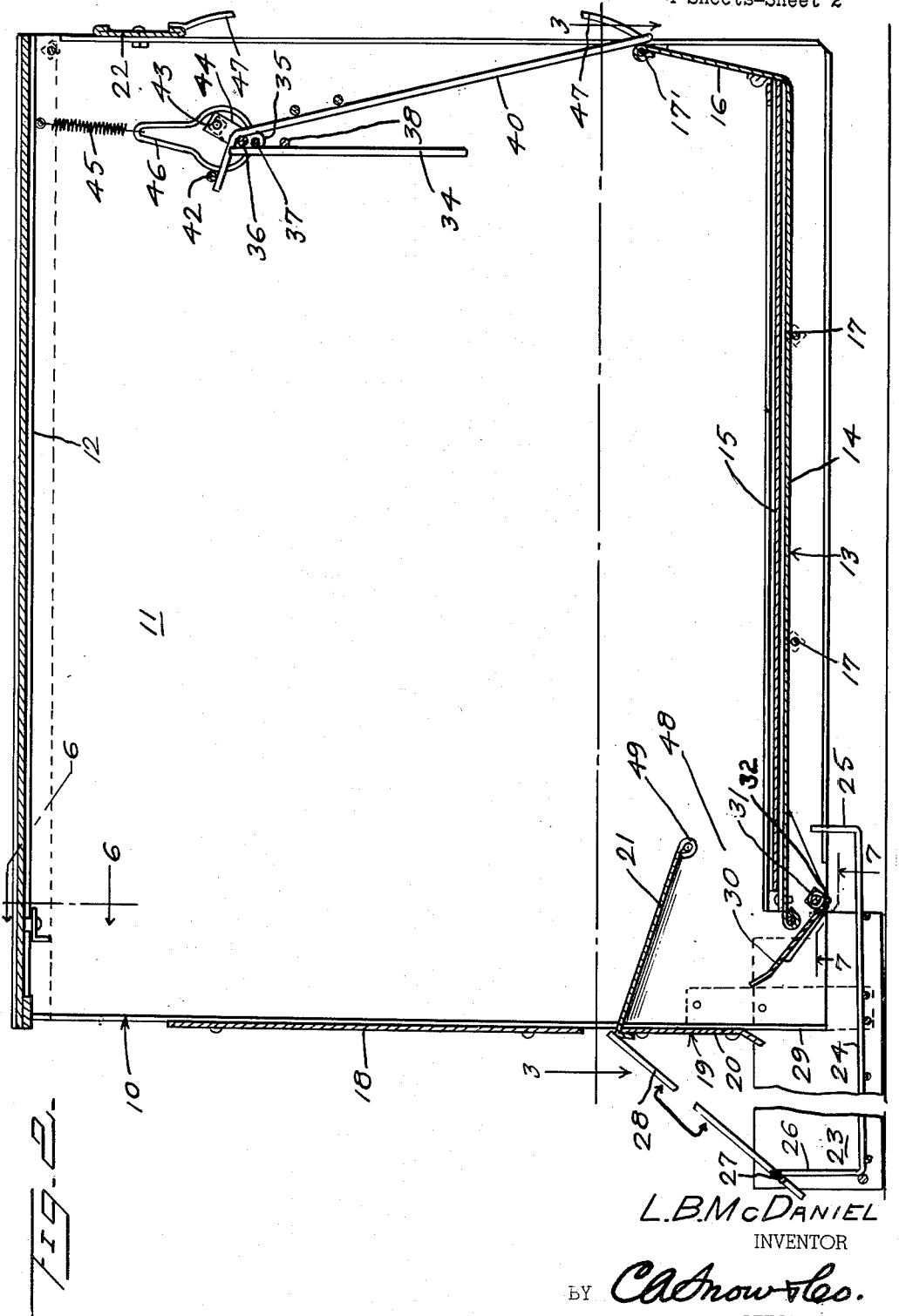

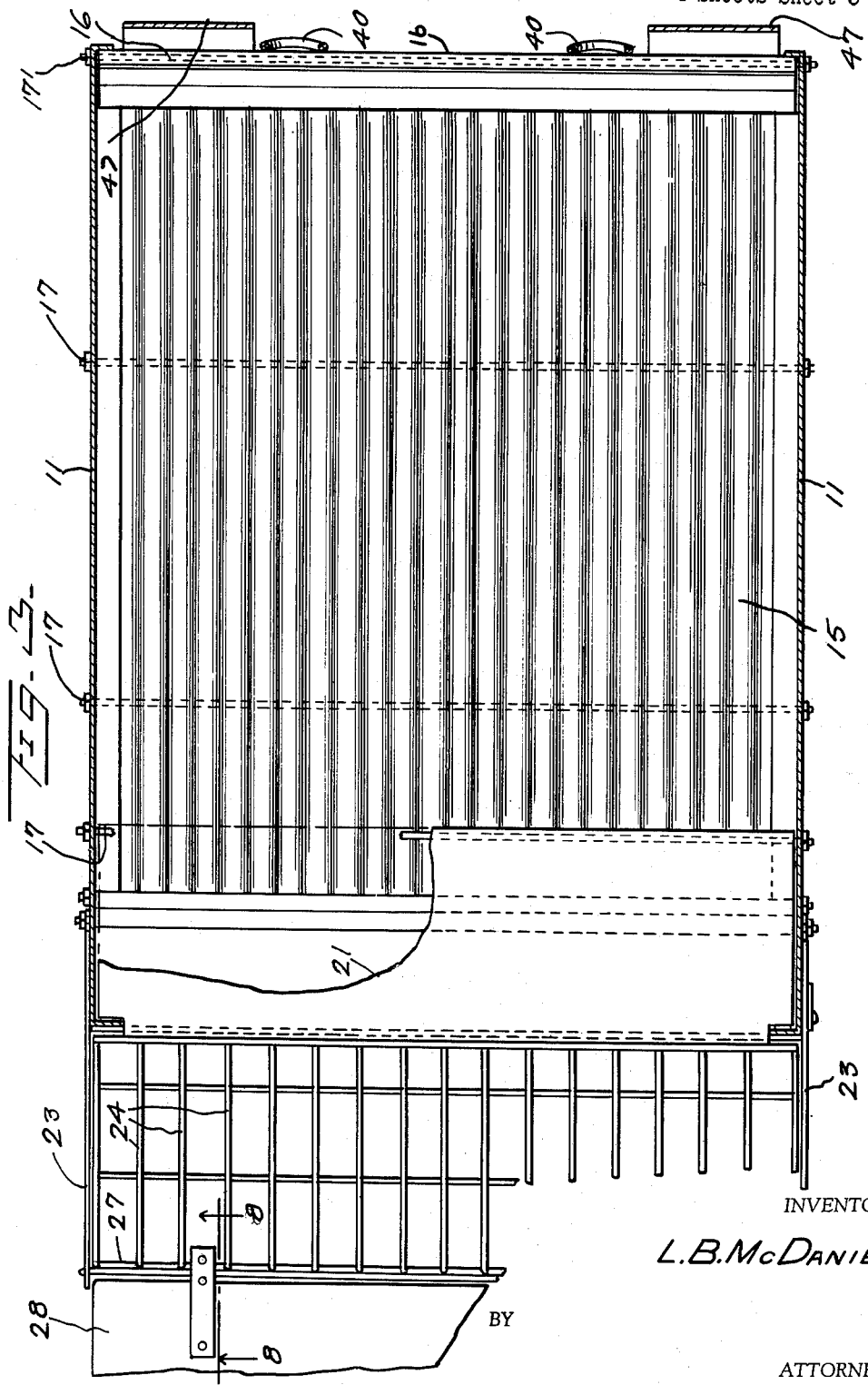

United States Patent Office 2,992,628
Patented July 18, 1961

2,992,628
POULTRY NEST
Lewis B. McDaniel, Box 53, Adelanto, Calif.
Filed Sept. 2, 1959, Ser. No. 837,713
2 Claims. (Cl. 119—49)

This present invention relates to poultry nests and more particularly to turkey nests.

It is an important object of this invention to provide a poultry nest in which the turkey hen can enter and leave at will.

Another object of this invention is to provide a poultry nest embodying a guard for preventing a turkey hen forcing entrance from the sides while the nest is occupied by a laying turkey.

Another object of this invention is to provide a poultry nest embodying means for preventing a turkey hen from stepping on the egg laid, which frequently results in egg breakage.

A further object of the invention is to provide a nest which will prevent a hen from thrusting her feet through an opening into the egg trough, adjacent to the nest, which also frequently results in egg breakage.

Still another object of this invention is to provide a poultry nest that can be constructed in a plurality of units suitable for use on large poultry farms, and are not only sanitary but are foolproof in use since they have no projection or moving parts which could injure a turkey hen using the nest.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit and intent of the invention as claimed.

Referring to the drawings:

FIGURE 1 is a front end view of this invention showing the gate and guard in a closed position.

FIGURE 2 is a sectional view taken substantially along the line 2—2 of FIGURE 1 as viewed in the direction indicated by the arrows.

FIGURE 3 is a sectional view taken substantially along the line 3—3 of FIGURE 2 as viewed in the direction indicated by the arrows.

FIGURE 4 is a sectional view taken substantially along the line 4—4 of FIGURE 1 as viewed in the direction indicated by the arrows.

FIGURE 5 is a sectional view taken substantially along the line 5—5 of FIGURE 4 as viewed in the direction indicated by the arrows.

FIGURE 6 is a sectional view taken substantially along the line 6—6 of FIGURE 2 as viewed in the direction indicated by the arrows.

FIGURE 7 is a fragmentary view taken substantially along the line 7—7 of FIGURE 2 as viewed in the direction indicated by the arrows.

FIGURE 8 is a sectional view taken substantially along the line 8—8 of FIGURE 3 as viewed in the direction indicated by the arrows.

FIGURE 9 is a perspective view of the major portion of the body of the poultry nest.

Similar reference characters refer to similar parts throughout the several views of the drawings.

Having reference now to the drawings in detail, and particularly to FIGURES 1 and 2, there is generally indicated by the reference character 10 a poultry nest embodying a box-like structure having sides 11, a removable top 12 and a bottom 13 which consists of a flat bottom plate 14 supporting a corrugated member 15, the corrugations being longitudinal as clearly shown in the stated FIGURE 2. The front portion of the flat bottom plate 14 is disposed at an upturned angle forming a bottom edge member 15 having a rolled edge so as not to cut or otherwise injure the hen as she enters or leaves the nest.

In the present form of this invention the bottom 13 is supported by a plurality of tie rods 17 that also assist in holding the stated sides 11 in spaced relation to one another. A tie rod 17' encompassed by the rolled edge of the end member will secure this member in its proper place in the front of the nest and also give additional rigidity to the same.

A panel 18 is secured to the inwardly turned edges of the rear end of the sides while slightly below the bottom edge of the stated panel there is located a cross member 19 that has the configuration of an inverted letter L having a vertical portion 20 and an angularly disposed portion 21 that inclines downwardly from the top of the aforesaid vertical portion 20 as clearly shown in FIGURE 9 of the appended drawings. It is of course realized that the cross member 19 may be of two piece construction, this later form being used in the present model as noted in FIGURE 2. The securing of a supporting member 22 to the front of each side 11 and near the top thereof completes the construction of the major portion of the structure of this invention to which an egg receiving trough is now secured at its rear end. This trough consists of side plates 23 and a plurality of horizontally disposed wires 24 secured in spaced relation to one another and at right angles to one another, the wires that are parallel to the sides of the nest are extended under the bottom 13 of the same and have their ends 25 turned upward as shown in FIGURE 2. The most rearward ends 26 of the wires 24 are also turned upward and are fixed to a hinged wire 27 that is at right angles to the stated wire 24. The hinge wire 27 is supported by the side plates 23 and provides a means of hingably mounting a lid 28 that is normally placed with its outer edge leaning against the top of the cross member 19 as also shown in FIGURE 2. Looking again at FIGURE 2, it will be seen that the bottom 13 of this nest terminates short of the right angled edge 29 of the sides 11 and has a flap 30 hingably mounted on a hinge rod 31 that is parallel to the rods 17.

A coiled spring 32 encompasses the hinge rod 31 and by reason of the fact that one side of the spring presses against the underside of the flap 30 while the other end of the spring rests on the underside of the stated bottom 13 which is obviously based on an upwardly inclined angle for a purpose to be described in detail in the operation of this poultry nest.

The assembly of all of the parts of the back end of this poultry nest have now been described in detail since it is desirable to add them to the nest at the time the panel 18 is secured in place. The only parts of this nest that remain to be assembled is the gate 33, the guard 39 and related detail of the two sub assemblies. The gate 33 comprises a pair of U-shaped members 34 made preferably of rigid wire as is most of the members of the gate assembly. The stated pair of U-shaped members are centrally located between the two sides 11 at the front of the nest and are spaced approximately the width of the average turkey hen so as to permit the entrance of the hen between each of the members 34 which are hingably mounted by means of a pair of hinge wires 35 to a support rod 36, the stated hinge wire encircling not only the supporting rod 36 but also one of the gate rods 37. A second rod 38 is secured at each end at one of the U-shaped members 34. It is to be realized that the gate 33 embodies only the pair of U-shaped member 34, gate rod 37 and second rod 38 all of which are secured together in the manner described to form a sub assembly of this invention.

The stated guard 39 comprised of a pair of elongated U-shaped members 40 preferably of rigid wire construction, each being held in parallel spaced relation to one another by a pair of cross rods 41 in the manner clearly shown in FIGURES 1 and 4 of the drawings. The elongated U-shaped members being located in approximate line with and in front of the gate 33. The guard 34 providing an opening slightly greater than that provided between the stated U-shaped members of the gate 33. The upper portion of the elongated U-shaped members 40 are disposed at an angle over the support rod 36 to which it is secured as seen on examination of FIGURES 1, 2 and 4. A guard brace rod 42 is fixed across the upper portion of the elongated U-shaped member 40, and is parallel to both the stop rods 43 which in turn is parallel to and slightly above the previously stated support rod 36 which is supported at each end by a hinge member 44 that is pivotally supported by the aforesaid stop rod 43 whose ends are held by the stated sides 11.

A tension spring 45 is secured at one end of the top flange of one side 11 while the other end of the spring is attached to a tension member 46, that being of rigid wire construction encircles both the stop rod 43 and the support rod 36 which it places under tension by reason of its contact with the same, as will be clearly understood by examination of FIGURES 2 and 4 of the drawings.

A fixed guard 47 is located on the outer side of each of the stated elongated U-shaped members and are secured at the top to the support member 22 and at the bottom to the end member 16 as shown in FIGURES 1 and 2 of the drawings.

The operation of this poultry nest is relatively simple, a turkey hen not shown in the drawings enters the nest by passing between the two U-shaped members 34 of the gate 33, the elongated U-shaped members 40 of the guard 39 being in upwardly disposed position shown in FIGURE 4. As the hen passes into the nest, she will brush against the side of the stated U-shaped members 34 causing them to swing in an upward direction, is indicated by the arrows in FIGURE 4. When the U-shaped members swing upwardly it will be due to their pressing against the guard brace rod 42 of the guard 39 that will not only cause the elongated U-shaped members 40 whose lower ends will now rest against the top of end member 16 as is clearly shown in FIGURES 1 and 2 of the drawings. It is obvious that the angular movement of the elongated U-shaped member 40 about the support rod 36 to which they are secured will also cause the entire assembly of both the gate 33 and the guard 39 to rotate about the stop rod 43. The tension spring 45 of course keeping both the gate and guard in tension at all times by reason of the tension members 46 as is obvious on looking at either FIGURE 2 or 4 of the drawings.

When the turkey hen has laid her egg she will of course leave the nest by again passing between the two U-shaped members 34 whose movement will cause the reverse of the previously described movement of both the stated gate 33 and the guard 39 and their associated members. The guard will of course again be in an upward position and the nest ready to receive another turkey hen. When an egg has been laid on the bottom 13 of the nest it will roll through an opening 48 between the rolled edge 49 of the angularly disposed portion of the cross member 19 and the corrugated member 15 of the bottom of the nest. The weight of the egg on the flap 30 will cause the flap to lower it onto the wire bottom of the egg receiving trough which is not designated by any one reference character, though its side plates are designated by the numeral 23. The egg will obviously roll under the flared edge of the vertical portion 20 of the cross member 19 on into that portion of the trough covered by the lid 28, where it may be collected at will. As soon as the egg rolls off the flap 30, the flip will return to its normal position shown in FIGURE 2 by reason of the coiled spring 32 as already described.

From the foregoing it will be now seen that there is herein provided a poultry nest which accomplishes all of the objects of this invention, and others, including many advantages of great practical utility and commercial importance.

As many embodiments may be made of this inventive concept, and as many modifications may be made of the embodiment herein before shown and described, it will be understood that all matter herein is to be interpreted merely as illustrative and not in a limiting sense.

What is claimed is:

1. In a trap nest, a box-like body having an entrance opening, a horizontal stop rod secured across the upper portion of said entrance opening of the body, a support rod pivotally connected to said stop rod disposed in parallel spaced relation with said stop rod below said stop rod, a pair of outwardly swinging U-shaped guard members secured at their upper ends to said support rod, a horizontal rod connecting said guard members, the upper extremities of said U-shaped guard members extending laterally beyond said supporting rod, the other ends of said U-shaped guard members adapted to contact the outer surface of the lower edge of said entrance opening, restricting inward movement of said guard members, a pair of connected parallel U-shaped gate members, pivotally mounted on said support rod for free swinging movement, said gate members having their upper ends extending beyond said support rod, adapted to engage said stop rod connecting said guard members normally restricting inward movement of said gate members, said gate members adapted to swing said guard members to closed position upon forced inward movement of said gate members by fowl entering the nest, and a spring controlled mechanism operatively associated with said support rod, normally biasing said gate to either an open or closed position.

2. The subject matter as claimed by claim 1, and in addition said spring controlled mechanism embodying a substantially circular tension member encircling said stop rod and support rod in contact with said support rod, and a coiled spring connected at one of its ends to said tensioning member, the opposite end of said spring being anchored to said nest body.

References Cited in the file of this patent

UNITED STATES PATENTS

| | | |
|---|---|---|
| 2,100,192 | Leindorf | Nov. 23, 1937 |
| 2,204,284 | Sifakas | June 11, 1940 |
| 2,640,220 | Arel | June 2, 1953 |
| 2,764,128 | Howley et al. | Sept. 25, 1956 |